Sept. 15, 1964     A. SCHWARZ     3,148,734
CONTROL DEVICE FOR ROTARY WING AIRCRAFT
Filed Aug. 25, 1961     3 Sheets-Sheet 3
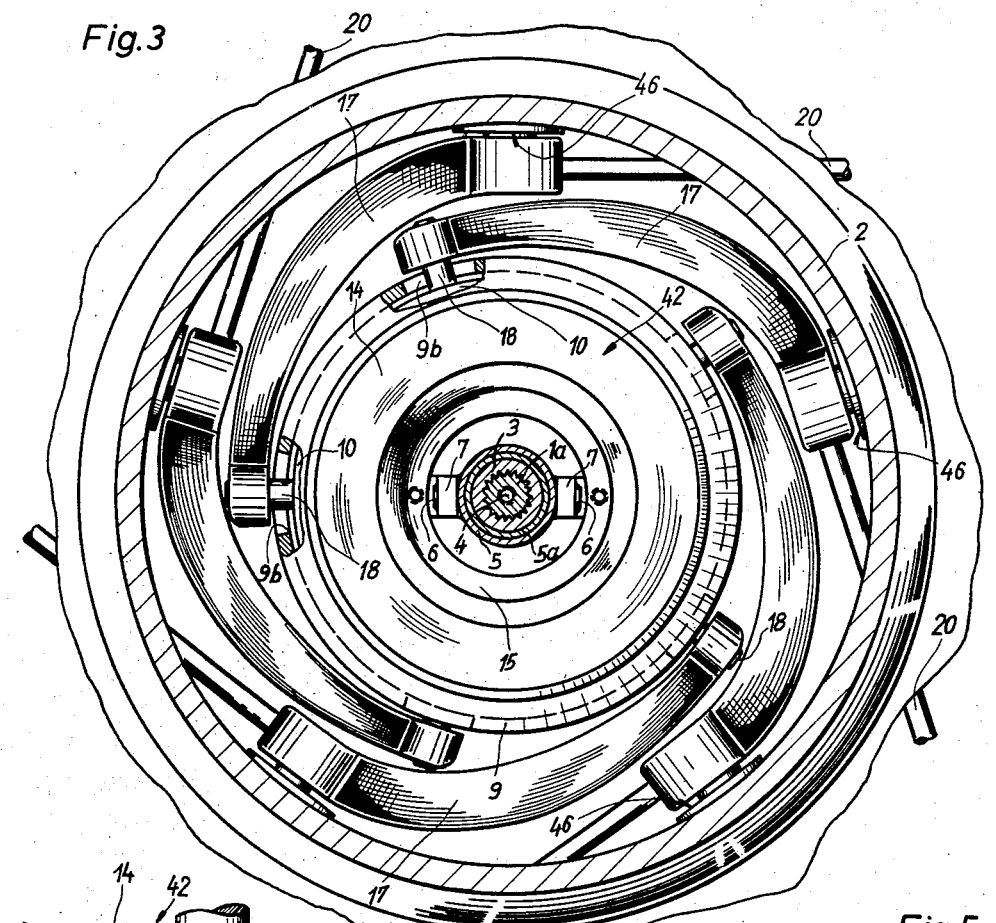
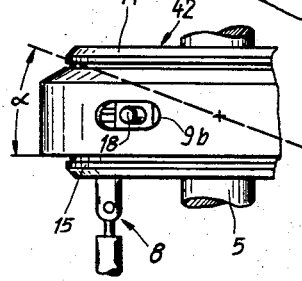
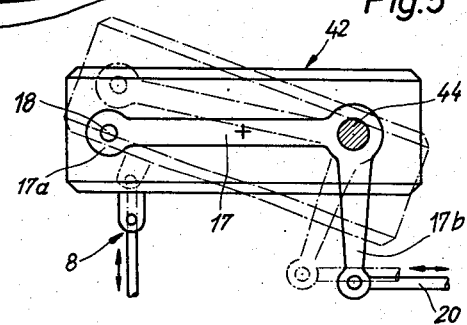
INVENTOR
*Alois Schwarz*
BY   *McGlew and Toren*
ATTORNEYS

United States Patent Office 3,148,734
Patented Sept. 15, 1964

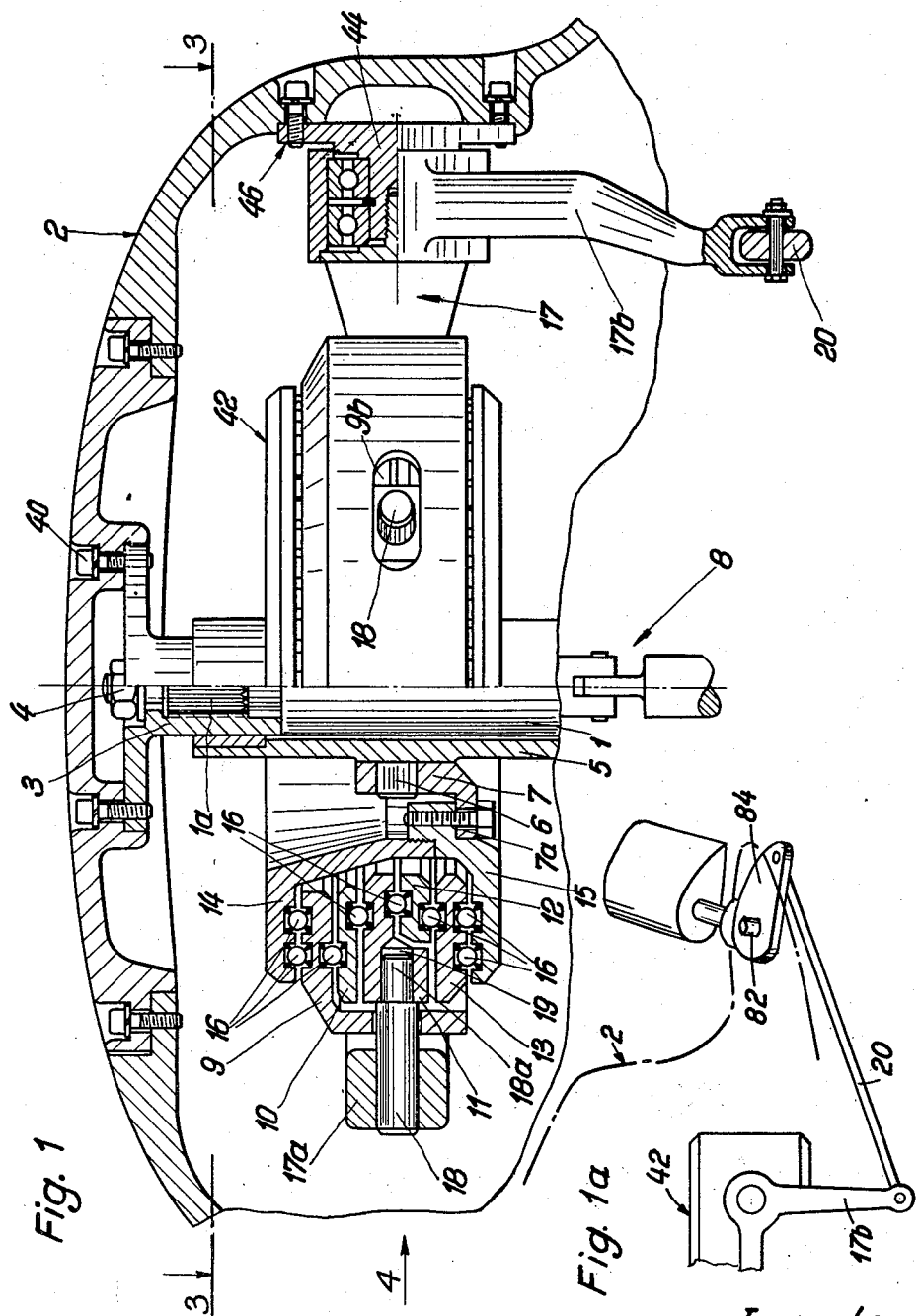

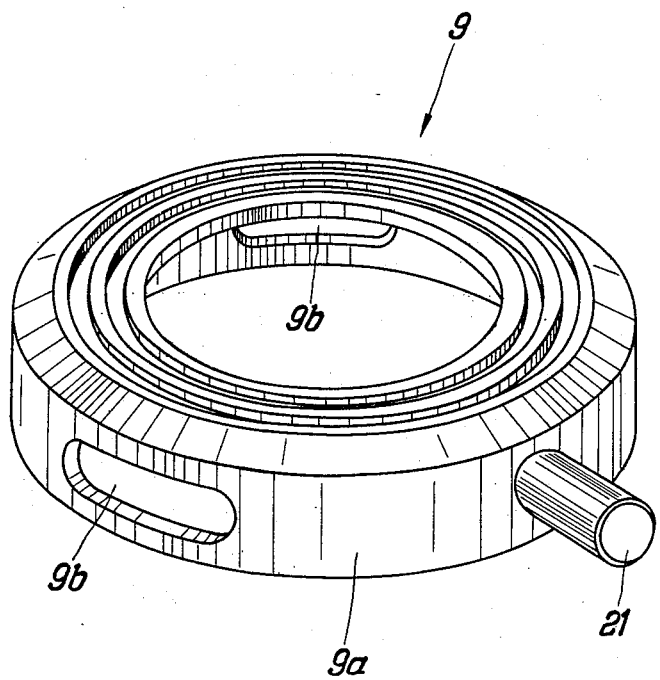

3,148,734
CONTROL DEVICE FOR ROTARY WING
AIRCRAFT
Alois Schwarz, Ottobrunn, near Munich, Germany, assignor to Bolkow-Entwicklungen Kommanditgesellschaft, Munich, Germany
Filed Aug. 25, 1961, Ser. No. 133,937
Claims priority, application Germany Sept. 8, 1960
9 Claims. (Cl. 170—160.25)

This invention relates in general to control mechanisms for actuating the blades of a rotary wing aircraft, and in particular to a new and useful swash plate control mechanism for controlling the rotative movements of the blades.

The present invention has particular application with respect to rotary wing aircraft having a rotatable central rotor with a plurality of blades pivotally mounted concentrically on said rotor. With constructions of this sort it has been known to superimpose accelerating and decelerating rotative movements to the blades during the overall rotative movement of the rotor. The mechanisms for accomplishing such blade movements in some instances have included individual take-offs or controls for the individual rotor blades which advance or retard the blades by moving them about their pivotal connections to the rotor during the overall rotation of the rotor itself. Mechanisms of this type usually provide a constant superimposed rotary speed to the blades in a horizontal plane. Such mechanisms may include, for example, an inclined swash plate wherein the individual controlled take-offs on the plate, when projected in a horizontal plane, move in such a plane with a non-uniform angular velocity. However, since it is a requirement of the rotor head that these take-off points, when projected, should move with a constant angular velocity, it is essential that they move relative to the overall swash plate construction. If this condition is not accomplished, then the individual points experience a difference in kinetic energy or impulse and undesirable overall rotative movements of the blades ensue.

When a rotary wing aircraft is flying at great forward velocity, the swash plate of the control mechanism for controlling the overall rotative movement of the blades has to be inclined rather steeply. Thus the amplitudes of the individual blade movements become greater and greater. With prior art mechanisms, the control error of movement of the blades increases, both with regard to blade angle change duration and also with regard to the rotary actuation of the blade. In such conditions, the requirement that the projections of the swash plate take-off points have to rotate with constant angular velocity is not fulfilled. This causes an error which, on the one hand, produces a non-uniform thrust distribution, and on the other hand, results in undesired mass forces which in turn disturb the even run or rotation of the rotor.

In accordance with the invention, there is provided a rotor construction which includes an internal bushing which non-rotatably supports a sleeve member which pivotally carries a swash plate assembly. The swash plate assembly includes a plurality of relatively rotatable swash plates which are concentrically and rotatably mounted in respect to the main shaft of the rotor. Crank arm members are provided for each of the rotor blades to advance and retard the blades about their pivotal connections to the rotor in accordance with movement effected on the crank arms by a follower portion which rides on a respective one of the plurality of independently rotatable plates of the swash plate assembly. A separate independently rotatable swash plate is provided for each of the crank arm members and its associated rotor blade.

Accordingly, it is an object of this invention to provide an improved control mechanism for pivoting the rotor blades of a rotary wing aircraft on a rotating hub.

A further object of the invention is to provide a swash plate control mechanism for controlling the overall rotative movement of helicopter blades which includes relatively rotatable individual swash plates for each blade.

A further object of the invention is to provide a swash plate control mechanism for guiding the movements of rotor blades of rotary wing aircraft which includes individual swash plate portions arranged to permit a controlled course of movement of each blade during a rotation of the aircraft rotor.

A further object of the invention is to provide a swash plate assembly for controlling the rotative movement of a helicopter blade which includes a plurality of concentrically mounted swash plates or rings all of which are pivotal in respect to the central rotor portion and which include independently rotatable individual ring or plate portions each adapted to control a separate one of the rotary wing aircraft blades.

A further object of the invention is to provide a swash plate control mechanism for guiding the movements of rotor blades of a rotary wing aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a fragmentary transverse section and partial elevation through a rotor head of a rotary wing aircraft having a swash plate constructed in accordance with the invention;

FIG. 1a is a somewhat schematic partial sectional and partial elevational view indicating the connection of the rotor blades to the swash plate;

FIG. 2 is a perspective view of one of the ring portions of the swash plate assembly;

FIG. 3 is a section taken on the line 3—3 of FIG. 1;

FIG. 4 is a partial side elevation on a reduced scale taken in the direction of the arrow 4 of FIG. 1 indicating the operation of the actuating arm; and, FIG. 5 is a schematic representation on a reduced scale of the swash plate assembly indicating the tilting of the swash plate and the associated crank lever member.

Referring to the drawings in particular, the invention embodied therein includes a main rotor shaft 1 which is rotated by a power source (not shown) and which drives a substantially cylindrical rotor head or hub generally designated 2. The hub 2 includes a bushing 3 which is secured to the interior wall by means of bolts 40 and is connected to the shaft 1 by means of a spline or gear connection 1a. The bushing 3 is secured in an axial direction on the shaft 1 by means of a bolt 4, and the inside of the bushing is arranged to bear against a collar or shoulder of the rotor shaft.

A sleeve 5 is freely mounted on the rotor shaft 1 and is anchored to a stationary portion of the aircraft to prevent its rotation along with the shaft. The sleeve carries a pair of pins 6 which project outwardly from diametrically opposite sides and which rotatably carry a respective supporting arm 7 having offset portions 7a which carry a swash plate assembly generally designated 42. Only one of the pins 6 and the support arm 7 are indicated for clarity of illustration purposes. The swash plate assembly 42 can be rocked or pivoted about the pins 6 by means of a rod system generally designated 8 in a well known manner. The purpose of the rocking is to incline the swash plate assembly in accordance with the speed attitude of the aircraft in order to vary the amplitude of blade acceleration and deceleration.

In accordance with the invention, the swash plate assembly 42 comprises a plurality of rings or plates 9, 10, 11, 12 and 13 corresponding in number to the number of rotor blades which are employed. The rings 9–13 are concentrically mounted about the main shaft 1 and the rotor axis. The rings are rotatable relative to each other and are held in an axial direction by outer cover portions 14 and 15 which are anchored against rotation by the angled portion 7a of the arm 7 and which are pivotal about the pins 6 with the arm 7.

In the embodiment shown, the aircraft is provided with a five blade rotor and one plate or ring 9–13 is provided for each rotor. The outer cover portions or rings 14 and 15 are secured together and the rings 9–13 are guided between these parts in axial and radial directions by means of ball bearings 16. Each of the rings is rotatable relative to the other rings. In the embodiment illustrated, ball bearings 16 are provided; however, any type of bearing including, for example, a fluid bearing, may be used.

According to a further feature of the invention, each of the rings 9–13, which are concentrically mounted in relation to the rotor axis and the shaft 1, is in follower connection with the rotor head 2. For this purpose, a plurality of double-armed levers or crank arms generally designated 17 are pivotally mounted about pins 44 of a pin bracket member generally designated 46, which levers are bolted to the interior of the rotor at circumferentially spaced locations. The number of pin brackets 46 and crank arm followers 17 corresponds to the number of rotor blades.

The double-armed levers or crank arms 17 include a lever arm portion 17a which, for the one shown, embraces an outer one 9 of the swash plates or rings 9–13 and carries a follower pin 18 which extends through a circumferentially elongated slot 9b of a circumferential side wall portion 9a of the plate or ring 9. The inner end of the pin 18a engages in a bore 19 of the plate 11 as indicated in FIG. 1. Each of the other plates 10, 12 and 13 is similarly connected to a respective lever arm or crank arm 17 in a similar manner. When the swash plate assembly is inclined, rotation of the rotor head 2 causes oscillation of the crank arm lever 17 and the arm portion 17b which is connected through a connecting rod 20 to an associated blade of the rotary wing aircraft (not shown) to cause advanced or retarded pivotal movement thereof on its pivotal connection to the periphery of the rotor head 2 during the rotation of the rotor head.

In FIG. 2, the outer ring 9 is indicated and it carries a pin 21 upon which is pivotally mounted a control crank lever 17 which receives its articulation from this particular plate or ring. Since the ring 9 embraces the rings 10–13, it is provided with four longitudinally extending slots 9b (only two of which are indicated in FIG. 2) to afford access of the connecting or following pins 18 of the control crank arms 17 for the other blades. The follower pins 18 of the other blades project through the slots 9b in the manner indicated in FIG. 1 for the plate 11. The slots 9b are made sufficiently long so that the pins 18 may move angularly to permit independent movement of each of the plates 9–13.

The device operates as follows:

In FIG. 1a it can be seen that a plurality of blades, such as blade 80, is mounted on a pivot pin 82 held on a lower portion of the rotor head 2 (indicated in dotted lines) for pivotal lead and lag movement in addition to the rotational movement along with the rotor head. The invention provides means for moving the blade through lead-lag pivotal movements in a controlled manner by the improved swash plate mechanism, generally designated 42, which includes the oscillatable double armed levers 17, one arm 17b of which is connected to a connecting rod 20. The connecting rod 20 is connected at its opposite end to a crank arm 84 which is rigidly connected to blade 80 and pivots about the pivot pin 82.

Upon rotation of the rotor shaft 1, the rotor head 2 is also caused to rotate via the spline gearing 1a. The double-armed levers or crank arms 17 which are mounted on the interior circumference of the rotor head are forced to move in accordance with the tilting angle of the individual swash plates acting through the respective pins 18 and 21. Since the arm portions 17b of the double-armed levers are connected to the individual blades, the blades are pivoted on their mounting of the rotor head in accordance with the angle of inclination of the swash plate assembly. The take-offs for the individual rotor blades thus move when the swash plate is inclined with a constant speed of rotation, synchronized to the rotation of the rotor shaft 1. The individual take-offs of the swash plate perform movements relative to each other in accordance with the principles of the invention.

With the inventive swash plate assembly, it is assured that each take-off on the circumference of the swash plate is guided relative to the drive shaft axis with a constant angular velocity. Thereby the blade angle course can be produced by a first harmonic and a pendulum type acceleration of the pivoting blades can be simulated without difficulty.

In FIG. 1, the swash plate assembly 42 is indicated in a level or untilted position. The term level is a relative one since the attitude of the aircraft may be other than upright, but in the orientation shown, it is intended to refer to the fact that the plate elements are arranged substantially perpendicular to the axis of the rotor head. The complete assembly 42 may be tilted about the axis of the pin 6, and the supporting arm 7 is rotatably supported on the pin for this purpose. The individual plates or rings 9, 10, 11, 12 and 13, which correspond to the number of blades employed, are all individually relatively movable. Relative rotation, however, is limited since they are each individually connected to a respective lever arm element 17, and the slot 9b only permits a slight relative movement between the individual plates before there is interference at the end of the slot by the pin 18. Since each crank arm 17 moves around with the head, the individual plate elements 9, 10, 11, 12 and 13 will also rotate with the head but may move relatively somewhat as limited by the slot 9b.

In FIG. 3, it can be seen how the crank arm elements 17 are mounted for pivotal movement about the pins 44 which are carried on the rotor head 2. The lower arm 17b is connected to the connecting rod members 20 which extends, as indicated in FIG. 3, outwardly for connection to the respective rotor blade elements. The opposite arm, of course, carries the pin 18, which is associated with a respective plate of the swash plate assembly.

In FIG. 4, it can be appreciated the manner in which the rod system 8 is manipulated to pivot the swash plate assembly. The swash plate assembly 42 may pivot through the angle indicated alpha.

In FIG. 5, there is a schematic indication showing the relative position of the parts, including the crank arm 17, when the swash plate is tilted.

While a specific embodiment of the invention has been shown and described in detail to illustrate the application of the inventive principles, it will be understood that the invention may be embodied otherwise without departing from such principles.

What is claimed is:

1. A swash plate for controlling the movement of rotor blades of a rotary wing aircraft comprising a stationary support, a swash plate assembly including a plurality of individual concentrically arranged ring members mounted on said stationary support for pivotal movement about a first tilting axis, means supporting said ring members in said assembly for independent rotative movement about a second common axis perpendicular to said first axis, and means connectable to each of said plate elements and movable upon movement of the rotor of the aircraft and rotation of said plates about said second axis for superimposing a movement on the rotor blades in accordance with the angle of inclination of the swash plate assembly in respect to said first axis.

2. A swash plate for controlling the movement of rotor blades of a rotary wing aircraft having a rotatable rotor and blades pivotally mounted on said rotor, comprising a stationary mounting, a swash plate assembly of a plurality of concentrically arranged ring members pivotally mounted on said stationary mounting for pivotal movement about a first tilting axis, said swash plate assembly including a separate ring member for each rotor blade, means supporting said ring members in said swash plate assembly for rotation about a second common axis perpendicular to said first axis, and means engageable with each plate and connectable to each respective rotor blade and movable upon rotation of said rotor to move said rotor blade in accordance with the disposition of the respective plate.

3. A swash plate for controlling the movements of rotor blades of a rotary wing aircraft according to claim 2, wherein said swash plate assembly is disposed concentrically in respect to the axis of said rotor.

4. A swash plate for controlling the movements of rotor blades of a rotary wing aircraft according to claim 2, wherein said means engageable with each plate and connectable to each respective rotor blade includes a crank arm member for each rotor blade pivotally connected to each of said ring members.

5. A device for controlling the movements of rotor blades of a rotary wing aircraft, comprising rotor means upon which a plurality of rotor blades are adapted to be pivotally mounted, a stationary supporting sleeve concentrically arranged in respect to the axis of rotation of said rotor means, a swash plate assembly including a plurality of concentrically arranged ring members pivotally mounted on said stationary sleeve member for tilting movement in an axis substantially perpendicular to the axis of said supporting sleeve member, said assembly including a ring member for each blade of the rotary wing aircraft, means supporting said ring members for independent rotative movement about an axis concentric to the axis of rotation of said rotor means, and means supported by said rotor means and engageable with a respective plate element and a respective rotor blade to move said rotor blades in accordance with the disposition of the respective plate element upon rotation of said rotor means.

6. A device according to claim 5, wherein said means supported on said rotor means includes a crank arm member having one arm with a pin at the end thereof which is pivotally connected to the associated one of said plate elements.

7. A rotary assembly for a helicopter, comprising a rotatable main shaft, a substantially cylindrical rotor head extending over one end of said main shaft and connected to said shaft for rotation thereby, a stationary sleeve member concentrically arranged around said shaft, a swash plate assembly comprising a plurality of cencentrically arranged ring members pivotally supported on said stationary sleeve member for tilting movement about an axis perpendicular to the axis of rotation of said shaft, said swash plate assembly including a separate ring member for the control of each of said rotor blades, means supporting said ring member in said assembly for independent rotative movement about a common axis, and means supported by said rotor pivotally connected to respective ones of said swash plate elements and to a respective one of said rotor blades to articulate said blades in response to rotation of said rotor in accordance with the tilt angle of said swash plate.

8. A device according to claim 7, having a substantially cylindrical rotor head wherein said means supported by said rotor include crank arms, pivotally connected on the inside at the rotor head.

9. A swash plate for controlling the movement of rotor blades of a rotary wing aircraft comprising a stationary support, a swash plate assembly including a plurality of individual plate elements mounted on said stationary support for pivotal movement about a first axis, means supporting said plate elements in said assembly for independent rotative movement about a second axis which is perpendicular to said first axis when said swash plate assembly is level, said separate plate elements being ring members, said ring members being held in an assembly by outer covering plate elements, bearing means between said ring members, and means connectable to each of said plate elements and movable upon movement of the rotor of the aircraft for super-imposing a movement on the rotor blades in accordance with the angle of inclination of the swash plate assembly in respect to said first axis.

References Cited in the file of this patent
UNITED STATES PATENTS

| | | |
|---|---|---|
| 2,511,687 | Andrew | June 13, 1950 |
| 2,919,753 | Hook | Jan. 5, 1960 |
| 2,957,526 | Derschmidt | Oct. 25, 1960 |